(12) United States Patent
Choi

(10) Patent No.: US 10,523,429 B2
(45) Date of Patent: Dec. 31, 2019

(54) METHOD AND DEVICE FOR SYNCHRONIZING QUANTUM DATA START POINTS IN QUANTUM KEY DISTRIBUTION SYSTEM

(71) Applicant: ID Quantique, Genève (CH)

(72) Inventor: Jeongwoon Choi, Seoul (KR)

(73) Assignee: ID Quantique, Genève (CH)

( * ) Notice: Subject to any disclaimer, the term of this patent is extended or adjusted under 35 U.S.C. 154(b) by 254 days.

(21) Appl. No.: 15/498,614

(22) Filed: Apr. 27, 2017

(65) Prior Publication Data

US 2017/0230174 A1 Aug. 10, 2017

Related U.S. Application Data

(63) Continuation of application No. PCT/KR2015/011016, filed on Oct. 19, 2015.

(30) Foreign Application Priority Data

Oct. 31, 2014 (KR) .................. 10-2014-0150135

(51) Int. Cl.
*H04L 9/08* (2006.01)
*H04B 10/70* (2013.01)
*H04L 9/12* (2006.01)

(52) U.S. Cl.
CPC ........... *H04L 9/0858* (2013.01); *H04B 10/70* (2013.01); *H04L 9/0819* (2013.01); *H04L 9/12* (2013.01)

(58) Field of Classification Search
CPC ............. H04B 10/70; H04L 9/0819; H04L 9/0852–0858; H04L 9/12
See application file for complete search history.

(56) References Cited

U.S. PATENT DOCUMENTS 5,903,570 A * 5/1999 Van Berkel .............. G06F 5/06
370/503
2005/0111667 A1 5/2005 Vig et al.
(Continued)

FOREIGN PATENT DOCUMENTS

KR 1020140055146 A 5/2014
WO 2005096540 A1 10/2005

OTHER PUBLICATIONS

International Search Report for PCT/KR2015/011016 dated Feb. 4, 2016.

*Primary Examiner* — Kevin Bechtel
(74) *Attorney, Agent, or Firm* — Hauptman Ham, LLP

(57) ABSTRACT

A method and apparatus for synchronizing a start-point of quantum data are disclosed. A method of determining a start-point of a quantum key distribution (QKD) protocol, at which a receiving apparatus of a QKD system starts the QKD protocol with a transmitting apparatus, includes receiving, by the receiving apparatus, an optical pulse sequence of a predetermined pattern from the transmitting apparatus, measuring, by the receiving apparatus, a predetermined quantum signal included in the optical pulse sequence, transmitting, by the receiving apparatus, a confirmation signal to the transmitting apparatus when the number of measurements of the predetermined quantum signal reaches a predetermined value, and determining, as the start-point, a point after one period of the optical pulse sequence from a point at which the number of measurements of the predetermined quantum signal has reached the predetermined value, or a point at which the confirmation signal has been transmitted.

9 Claims, 6 Drawing Sheets

(56) References Cited

U.S. PATENT DOCUMENTS

| | | |
|---|---|---|
| 2007/0098402 A1 | 5/2007 | Maeda et al. |
| 2008/0037790 A1 | 2/2008 | Berzanskis et al. |
| 2008/0101607 A1 | 5/2008 | Liang et al. |
| 2009/0196419 A1 | 8/2009 | Tapster |
| 2010/0208893 A1* | 8/2010 | Toyoshima ........... H04L 9/0858 380/256 |
| 2013/0163759 A1 | 6/2013 | Harrison et al. |

* cited by examiner

METHOD AND DEVICE FOR SYNCHRONIZING QUANTUM DATA START POINTS IN QUANTUM KEY DISTRIBUTION SYSTEM

CROSS-REFERENCE TO RELATED APPLICATIONS

This application is a continuation application of International Application No. PCT/KR2015/011016 filed on Oct. 19, 2015, which claims priority to Korean Application No. 10-2014-0150135 filed on Oct. 31, 2014, which applications are incorporated herein by reference.

TECHNICAL FIELD

The present disclosure in some embodiments relates to a method and apparatus for enabling a transmitting apparatus and a receiving apparatus of a quantum key distribution system to have a synchronized start-point of quantum data.

BACKGROUND

The statements in this section merely provide background information related to the present disclosure and do not necessarily constitute prior art.

An RSA-based cryptosystem, which is widespread in current communication systems, is to utilize a very difficult mathematical problem as a public key for encrypting data, and to use the solution thereof as a private key for decrypting the encrypted data, working based on mathematical complexity.

A cryptosystem based on mathematical complexity is considered to become fundamentally decipherable when a new prime factorization algorithm or a quantum computer is developed. As a counter-measure to solve such a security issue, a security method using a quantum cryptography is emerging.

Where a quantum key distribution is used, the act of tapping or eavesdropping on communications from a third party other than the transmitting and receiving parties changes the quantum state, and thus renders the original encrypted content indeterminable, and additionally uncovers the tapping attempt.

To normally operate a quantum key distribution system, an optical system needs synchronization and stabilization to counter errors due to external environmental changes. In other words, start-points of quantum data or a modulated quantum signal sequence need to be accurately synchronized between a transmitting apparatus and a receiving apparatus of the quantum key distribution system.

DISCLOSURE

Technical Problem

Therefore, the present disclosure has been made in an effort to provide a method and apparatus for synchronizing a start-point of quantum data without decrease of quantum channel capacity, or without the provision of additional hardware.

SUMMARY

In accordance with some embodiments of the present disclosure, a method of determining a start-point of a quantum key distribution (QKD) protocol, at which a receiving apparatus of a QKD system starts the QKD protocol with a transmitting apparatus includes receiving, by the receiving apparatus, an optical pulse sequence of a predetermined pattern transmitted through a quantum channel from the transmitting apparatus, measuring, by the receiving apparatus, a predetermined quantum signal included in the optical pulse sequence of the predetermined pattern, transmitting, by the receiving apparatus, a confirmation signal to the transmitting apparatus when the number of times of measuring the predetermined quantum signal reaches a predetermined number of times, and determining, as the start-point, a point of time at which a predetermined additional time has elapsed, after a point of time at which the number of times of measuring the predetermined quantum signal has reached the predetermined number of times, or after a point of time at which the confirmation signal has been transmitted.

In accordance with another embodiment of the present disclosure, a method of determining a start-point of a quantum key distribution (QKD) protocol, at which a transmitting apparatus of a QKD system starts the QKD protocol with a receiving apparatus includes transmitting periodically, by the transmitting apparatus, an optical pulse sequence of a predetermined pattern including a predetermined quantum signal through a quantum channel, receiving, by the transmitting apparatus, a confirmation signal indicating that the predetermined quantum signal has been measured by a predetermined number of times, from the receiving apparatus, and determining a transmission point of time of the predetermined quantum signal transmitted just after receiving the confirmation signal, as the start-point of the QKD protocol.

Advantageous Effects

According to at least one embodiment of the present disclosure, a synchronized start-point of quantum data is provided without decreasing quantum channel capacity, or without the provision of additional hardware.

Additionally, according to at least one embodiment, error or loss of a quantum signal due to a strong synchronization signal normally used in conventional ways may be prevented.

REFERENCE NUMERALS

Figure 1:
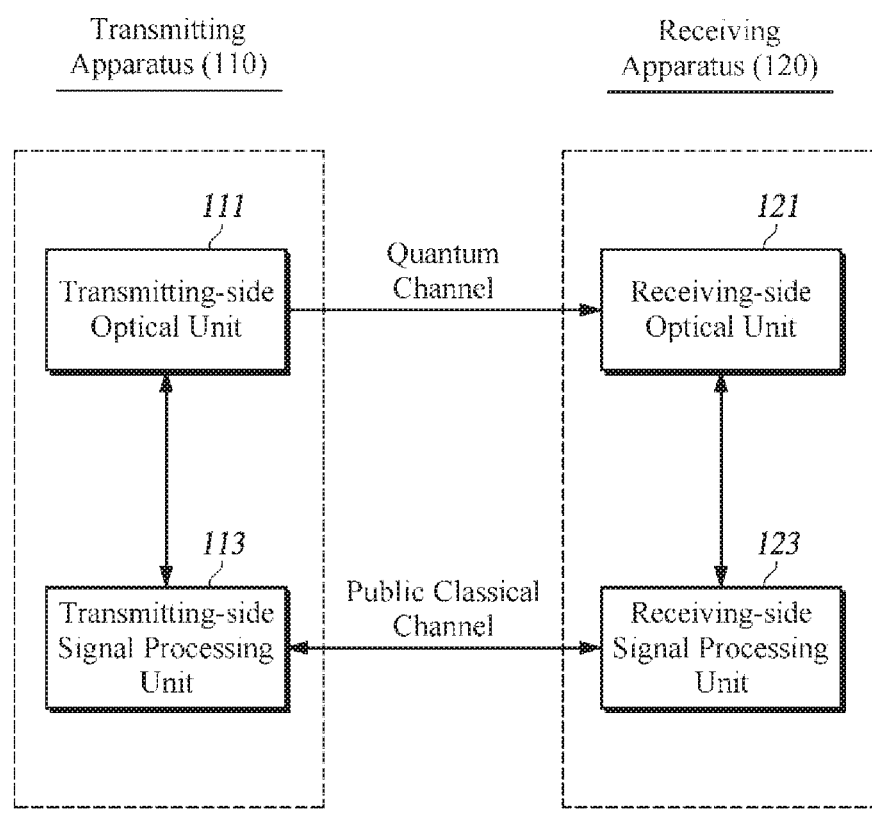
FIG. 1 is a diagram illustrating the configuration of a transmitting apparatus and a receiving apparatus of a typical quantum key distribution system.

| | |
|---|---|
| 110: transmitting apparatus | 111: transmitting-side optical unit |
| 113: transmitting-side signal processing unit | |
| 120: receiving apparatus | 121: receiving-side optical unit |
| 123: receiving-side signal processing unit | |

DETAILED DESCRIPTION

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding the same unless there is a particular description contrary thereto. The terms such as "unit" and "module" refer to units for processing at least one function or operation, which may be implemented by hardware, software, or a combination thereof.

FIG. 1 is a diagram illustrating the configuration of a transmitting apparatus and a receiving apparatus of a typical quantum key distribution system.

A quantum key distribution system includes a transmitting apparatus 110 and a receiving apparatus 120.

The transmitting apparatus 110 of the quantum key distribution system includes a transmitting-side optical unit 111, and a transmitting-side signal processing unit 113. The transmitting-side optical unit 111 transmits quantum signals through a quantum channel. The transmitting-side signal processing unit 113 transmits and receives a classical signal and data, and processes all logical and functional parts related to implement a quantum key distribution protocol.

The receiving apparatus 120 of the quantum key distribution system includes a receiving-side optical unit 121, and a receiving-side signal processing unit 123. The receiving-side optical unit 121 receives the quantum signals through the quantum channel. The receiving-side signal processing unit 123 transmits and receives the classical signal and data, and processes all logical and functional parts related to implement a quantum key distribution protocol.

The transmitting apparatus 110 and the receiving apparatus 120 exchange data through the quantum channel and a public classical channel. The quantum channel is the core of the quantum key distribution system, and is kept secure by the principles of quantum mechanics, while the public classical channel is subject to tapping or eavesdropping performed by a third party. Through the quantum channel, a quantum signal or quantum data are transmitted. In the public classical channel, operations are performed, including controlling of the system and communications, distributing clocks, running of a quantum key distribution protocol, and the like.

Figure 2:
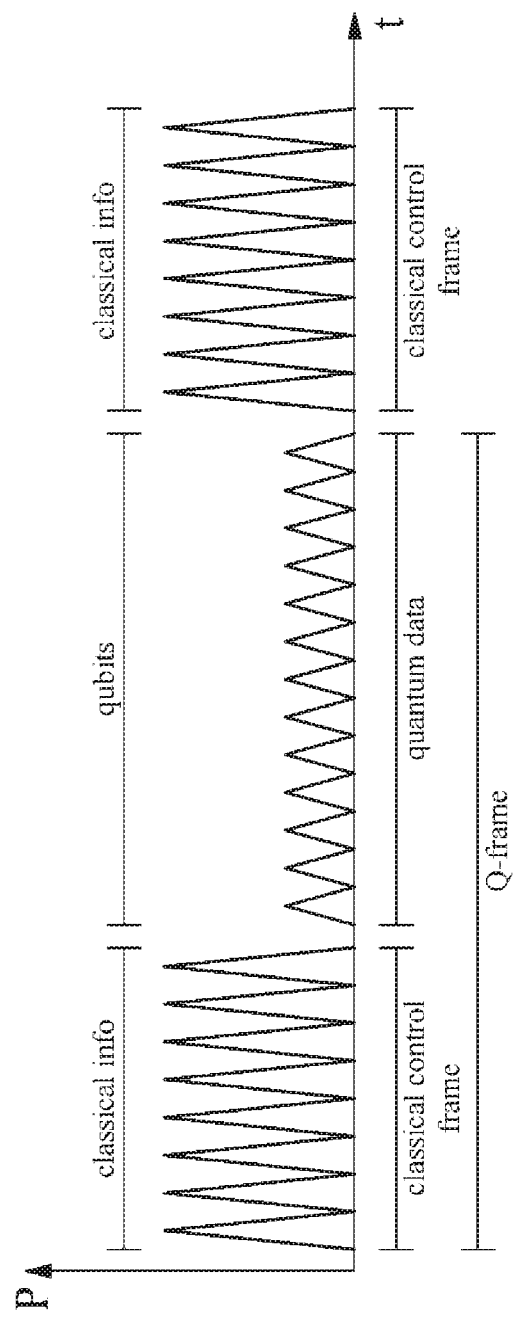
FIG. 2 is a diagram illustrating a formatted frame for transmitting quantum data in the conventional quantum key distribution system.

FIG. 2 is a diagram illustrating a formatted frame for transmitting quantum data in the conventional quantum key distribution system.

In quantum communication, quantum signals are generally exchanged in units of a qubit by using a single or a few photons, unfortunately with a lot of signal distortion or noise generated due to the sensitiveness of the single photon to external influences. Accordingly, in order to synchronize a start-point of quantum data, a method of inserting classical signals before and after a quantum signal has been generally used as illustrated in FIG. 2.

According to the method of FIG. 2, preamble and header information are appended to the quantum signal so as to identify a measured quantum signal by nth bit of nth frame. At this time, the preamble and header information need to be accurately recognized, and therefore a quantum signal may not be used for a preamble or header portion, but a classical signal needs to be used therefor to transmit the same using a strong signal such as a conventional communication signal.

In this process, additional hardware components such as a laser diode (LD), a switch, a filter, and a wavelength division multiplexer (WDM) are needed to simultaneously drive a strong signal and a weak signal, and in addition, there is a need to prevent scattering by a strong signal, crosstalk, signal error, signal loss, and the like. Another issue is reduced quantum channel capacity due to an additional assignment of time domain in the quantum channel.

Hereinafter, description is given of a method and apparatus, of at least one embodiment, for providing a synchronized start-point of quantum data.

A quantum key distribution system utilizes two communication channels, a quantum channel and a public classical channel.

The quantum channel is the core of the quantum key distribution system, and is a channel kept secure by the principles of quantum mechanics. The quantum channel renders tapping or eavesdropping by a third party impossible.

The public classical channel is a channel in which a quantum key is distributed and furthermore an eavesdropper is detected by implementing a quantum key distribution protocol consisting of various steps such as a basis comparison, an error estimation, an error correction and a privacy amplification. In the public classical channel, tapping or eavesdropping by a third party is possible. However, this fact does not make any influence to the whole security of a quantum key distribution.

In the quantum key distribution system, the transmitting apparatus 110 and the receiving apparatus 120 exchange data through the quantum channel and the public classical channel. Transmission of quantum signals or quantum data is performed in the quantum channel, and operations are performed in the public classical channel, such as control of a system and communication, clock distribution, and driving of a quantum key distribution protocol.

The operation that the transmitting apparatus 110 and the receiving apparatus 120 synchronize the start-point of quantum data is for two distant parties of the transmitting apparatus 110 and the receiving apparatus 120 to share the sequentially transmitted quantum data in identical order and locations.

The transmitting apparatus 110 and the receiving apparatus 120 for quantum key distribution stably operate internally with consistency. However, it is difficult for the quantum channel and the public classical channel exposed to the outside of the apparatus to be kept stable. Because the length of an optical fiber between the transmitting apparatus 110 and the receiving apparatus 120 varies not only according to the position which the transmitting apparatus 110 and the receiving apparatus 120 are installed at, but also frequently by external temperature, the flying time of light through the quantum and public classical channel will vary all the time.

However, because there are stabilization technologies for minimizing such variability, and such variability is relatively slow compared with the operating speed of the system, the system may be considered, on the basis of each round for which the quantum key distribution protocol is driven, to be able to maintain consistency.

As a result, the system may be configured such that the operating time for a series of processes from generation, transmission, and measurement of a quantum signal, to sharing of measurement results is constant. In at least one embodiment, the operating time is assumed to be constant for a series of data processing which proceeds in the order of the signal processing unit of the transmitting apparatus 110 (hereinafter, referred to as transmitting-side signal processing unit), the optical unit of the transmitting apparatus 110 (hereinafter, referred to as transmitting-side optical unit), the optical unit of the receiving apparatus 120 (hereinafter, referred to as receiving-side optical unit), and the signal processing unit of the receiving apparatus 120 (hereinafter, referred to as receiving-side signal processing unit).

Figure 3:
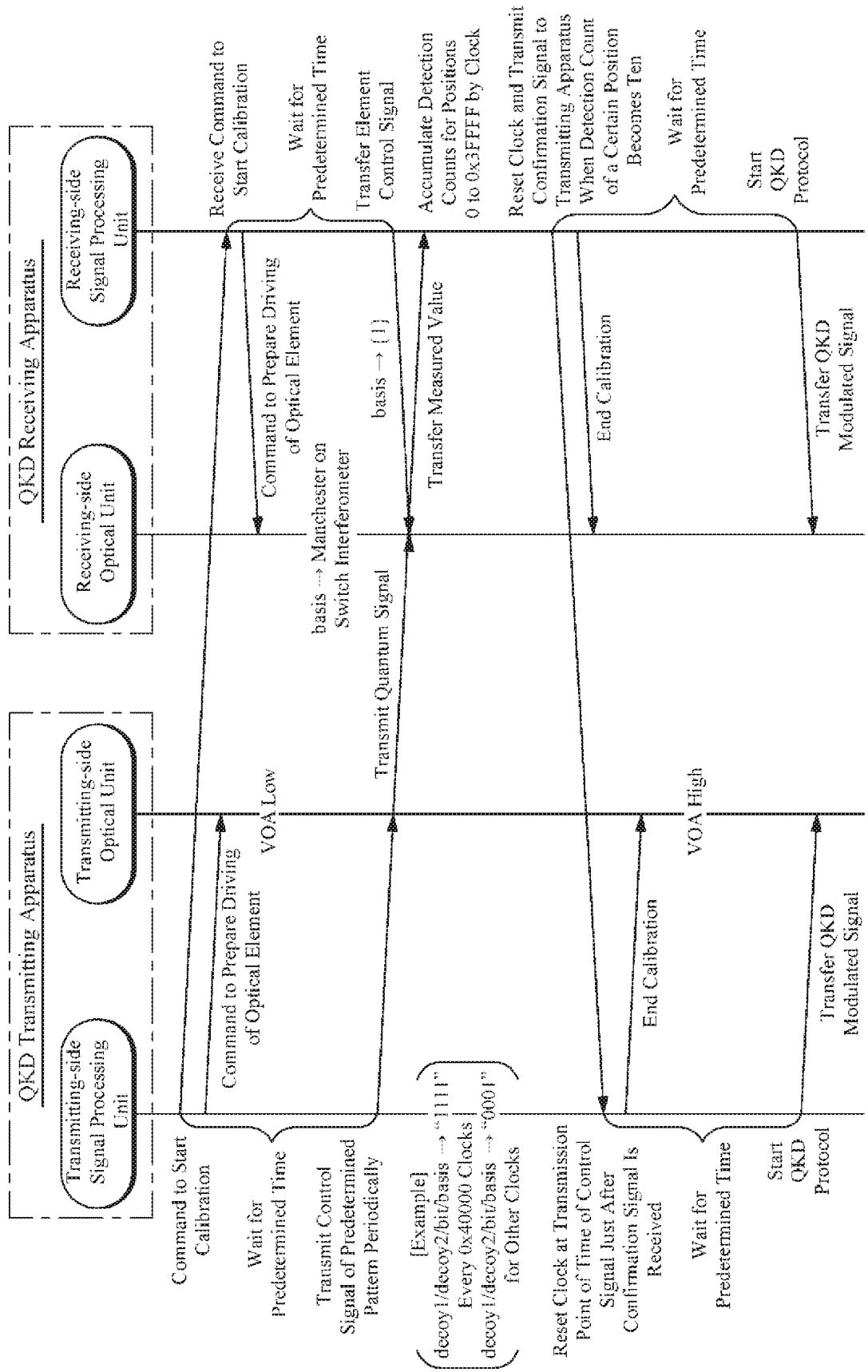
FIG. 3 is an exemplary diagram illustrating a process of quantum data start-point synchronization in chronological order, according to at least one embodiment.

FIG. 3 is an exemplary diagram illustrating a process of quantum data start-point synchronization in chronological order, according to at least one embodiment.

The technology for synchronizing the start-point is a technology for the transmitting apparatus 110 and the receiving apparatus 120 to adjust a position of each quantum data in the unit of a clock, and may be considered to be as one of the calibration processes for the quantum key distribution system. It is desirable for the synchronization of the start-point according to at least one embodiment to be performed before driving the quantum key distribution protocol, after the quantum key distribution system is powered on, and stabilization of optical elements are finished. In addition, the synchronization of the start-point according to at least one embodiment may be performed even when malfunction occurs due to an external attack or a system error while the quantum key distribution system is operating normally.

The transmitting apparatus 110 transmits a command to synchronize the start-point to the receiving apparatus 120, and drives a clock counter after a predetermined time. The receiving apparatus 120 receives the command to synchronize the start-point from the transmitting apparatus 110, and drives a clock counter having a period equal to that of the clock counter of the transmitting apparatus 110 after a predetermined time.

When the start-point synchronization is started, the transmitting-side optical unit may change driving conditions of various optical and electrical components for synchronizing the start-point. For example, by setting a variable optical attenuator (VOA) to a low level, an intensity of an optical pulse transmitted when the start-point synchronization is performed may be made larger than an intensity of an optical pulse transmitted when the quantum key distribution protocol is performed.

In case where an optical pulse is used as a quantum signal, there occurs a lot of signal distortion or noise due to the sensitivity that a single photon has, and additionally, the probability that the transmitted photon is measured in the receiving apparatus 120 is as small as 1/1000 to 1/100 due to the loss of channel and the detection efficiency of a single photon detector. Accordingly, an intensity of an optical pulse transmitted when the start-point synchronization is performed should be made large by setting the variable optical attenuator to the low level, so as to rapidly perform the start-point synchronization.

After time elapses enough to ensure that both the transmitting apparatus 110 and the receiving apparatus 120 are in the mode of the process of synchronizing the start-point, the transmitting apparatus 110 transmits a control signal of a predetermined pattern (hereinafter, referred to as optical pulse sequence) to the receiving-side optical unit.

When the start-point synchronization is started, the transmitting apparatus 110 periodically transmits a modulated optical pulse sequence of the predetermined pattern. In this case, it may be possible that a meaningful quantum signal is included only at a predetermined point of time within one period of the optical pulse sequence, and a meaningless quantum signal is included for the rest of time.

The meaningful quantum signal may be a non-vacuum signal or a signal having a predetermined intensity, and the meaningless quantum signal may be a vacuum signal or a signal having a very small intensity. For example, the meaningful quantum signal and the meaningless quantum signal may be distinguished by having an optical pulse with a larger intensity only at the predetermined point of time within one period of the optical pulse sequence than when the quantum key distribution protocol is performed, and having, for the rest of time, an optical pulse with a smaller intensity than when the quantum key distribution protocol is performed, or a vacuum optical pulse.

Figure 4:
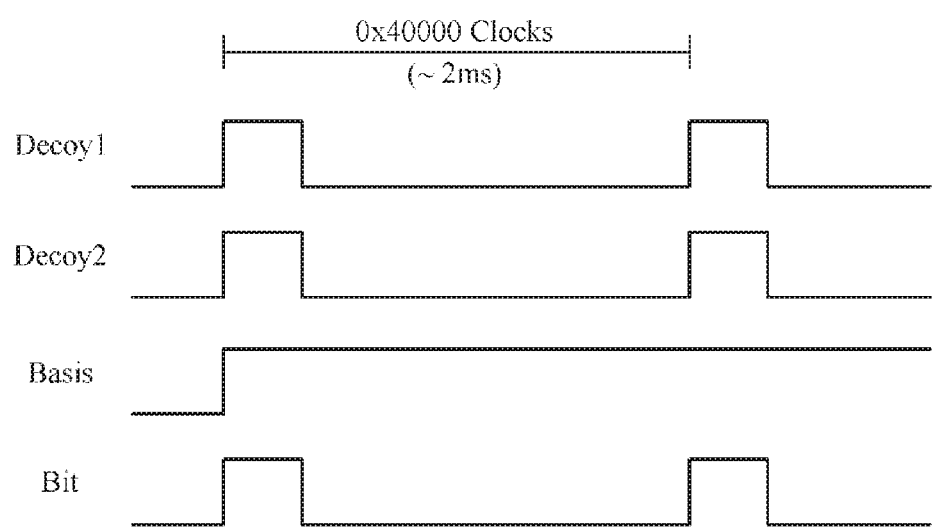
FIG. 4 is an exemplary diagram illustrating an optical pulse sequence used in the quantum data start-point synchronization according to at least one embodiment.

FIG. 4 is an exemplary diagram illustrating an optical pulse sequence used in the quantum data start-point synchronization according to at least one embodiment.

In the optical pulse sequence exemplarily illustrated in FIG. 4, the meaningful quantum signal is constructed by setting decoy1, decoy2, basis, and bit to '1111'. For reference, fixing basis to 1 on both the transmitting and receiving apparatuses may be better for statistical analysis of measurement results.

A period of the optical pulse sequence is determined by considering the distance between the transmitting apparatus 110 and the receiving apparatus 120. This is because time taken for the meaningful quantum signal included in the optical pulse sequence transmitted by the transmitting apparatus 110 every predetermined period to be measured meaningfully in the receiving apparatus 120, and then for the transmitting apparatus 110 to receive a result thereof should be less than or equal to the period of the optical pulse sequence.

In FIG. 4, the period of the optical pulse sequence is set to about 2 ms. 2 ms is a time that corresponds to 0x40000 clocks in a quantum key distribution system that is driven at 125 MHz.

The reason for setting the period of the optical pulse sequence to 2 ms in at least one embodiment is to make the method and apparatus for synchronizing the start-point in at least one embodiment usable even in the case that the distance between the transmitting apparatus 110 and the receiving apparatus 120 for the quantum key distribution is close to about 200 km, when the speed of light within a fiber optic cable is considered. Considering the speed of light within a fiber optic cable is about $2 \times 10^5$ km/s, it takes about 1 ms for the light to arrive when quantum data is transmitted to a place 200 km away. Because it takes about 2 ms for the light to make a round trip, the period of the optical pulse sequence of 2 ms is sufficient.

In a quantum key distribution system that is driven at 125 MHz, the period of the optical pulse sequence may be set to 0x40000 clocks. Hexadecimal 0x40000 is 262144 in decimal, and because one clock cycle for 125 MHz corresponds to 1/125000 ms, 262144 clocks take (1/125000)× 262144=2.097152 ms. In this case, the period of the optical pulse sequence becomes about 2 ms, and thus at least one embodiment may be applied to the case that quantum data is transmitted to a place 200 km away.

The period of the optical pulse sequence is not fixed to 2 ms, but may be set differently depending on the distance between the transmitting apparatus 110 and the receiving apparatus 120. In at least one embodiment, however, a case is described that an optical pulse sequence having a period of 0x40000 clocks is transmitted in a quantum key distribution system driven at 125 MHz.

The receiving apparatus 120 assigns memory of a size corresponding to one period of the optical pulse sequence. Because 0x40000 clocks are set to one period of the optical pulse sequence in at least one embodiment, the receiving apparatus 120 assigns memory of a size of 0x40000. The memory of a size of 0x40000 has memory addresses 0 to 0x3FFFF.

The receiving apparatus 120 increases address of memory for reading and writing by one as clock number increases by one. When the clock number reaches one period of the optical pulse sequence, the clock number is reset to 0, and the memory address corresponding to the clock number is reset to 0. In at least one embodiment, because memory addresses 0 to 0x3FFFF are assigned respectively to clock numbers 0 to 0x3FFFF, clock number and memory address corresponding to the clock number are reset to 0 when the dock number becomes 0x40000.

The receiving apparatus 120 measures the meaningful quantum signal in the optical pulse sequence transmitted by the transmitting apparatus 110, and when the meaningful quantum signal is measured, the receiving apparatus 120 checks clock number of the receiving-side signal processing unit, and then increases, by one, the value in a memory address corresponding to the clock number. For example, when the meaningful quantum signal is measured when the clock number of the receiving apparatus 120 is 0x2AE14, the value stored in memory address 0x2AE14 is increased by one.

At a clock at which the number of times of measuring the meaningful quantum signal becomes a threshold value, the receiving apparatus 120 resets a clock counter, and transmits a confirmation signal to the transmitting apparatus 110. The confirmation signal is a signal by which the receiving apparatus 120 notifies the transmitting apparatus 110 that the receiving apparatus 120 has normally determined the position of the meaningful quantum signal.

The method of synchronizing the start-point of at least one embodiment determines that the meaningful quantum signal has been normally measured when the number of times of measuring the meaningful quantum signal becomes the threshold value. The threshold value may be adjusted by considering various conditions such as signal intensity, and the distance between the transmitting apparatus 110 and the receiving apparatus 120.

The receiving apparatus 120 determines, as the start-point, a point of time at which one additional period of the optical pulse sequence has elapsed, right after a point of time at which the meaningful quantum signal has been measured as many as the threshold value, or a point of time at which the confirmation signal has been transmitted. When the start-point is determined, the receiving apparatus 120 waits for a predetermined time needed to reset and prepare driving of an optical element, and then starts the quantum key distribution protocol.

The transmitting apparatus 110 determines, as the start-point, the first point of time that the meaningful quantum signal included in the optical pulse sequence is generated, right after the transmitting apparatus 110 receives the confirmation signal from the receiving apparatus 120. In other words, the transmitting apparatus 110 determines, as the start-point, the transmission point of time of the meaningful quantum signal transmitted just after the confirmation signal is received. When the start-point is determined, the transmitting apparatus 110 waits for a predetermined time needed to reset and prepare driving of an optical element, and then starts the quantum key distribution protocol.

Table 1 shows, by way of example, values stored in memory of the receiving apparatus 120. Measurements may be by the quantum signal, or may be also by noise such as dark count and after-pulse. In other words, when the receiving apparatus 120 determines that the meaningful quantum signal has been measured, the meaningful quantum signal may have been actually measured, or the noise due to the dark count or after-pulse may have been measured. Accordingly, in at least one embodiment, a point of time at which the number of times of measuring the meaningful quantum signal becomes greater than or equal to a predetermined threshold is considered as a point of time at which the meaningful quantum signal is actually measured.

TABLE 1

| Memory Address | Detection Count |
|---|---|
| 0x00000 | 1 |
| 0x00001 | 0 |
| 0x00002 | 2 |
| ... | ... |
| 0x2AE14 | 10 |
| ... | ... |
| 0x3FFFE | 2 |
| 0x3FFFF | 1 |

Referring to Table 1, it may be seen that the meaningful quantum signal is measured once for clock 0x00000, zero times for clock 0x00001 and ten times for clock 0x2AE14.

When the threshold value is assumed to be ten times, because the meaningful quantum signal is measured ten times for clock 0x2AE14, the receiving apparatus 120 transmits the confirmation signal to the transmitting apparatus 110, and a point of time at which a 'certain time' has elapsed from clock 0x2AE14 is determined as the start-point. For example, one period of the optical pulse sequence (0x40000 clocks in at least one embodiment) may be set as the 'certain time'.

The transmitting apparatus 110 determines, as the start-point, a point of time at which a 'certain time' has elapsed from a point of time of the meaningful quantum signal included in the previous optical pulse sequence, after the transmitting apparatus 110 receives the confirmation signal from the receiving apparatus 120. For example, one period of the optical pulse sequence (0x40000 clocks in at least one embodiment) may be set as the 'certain time'.

A probability of measuring the meaningful quantum signal should be larger than a probability of measuring the meaningless quantum signal so that the measurement is for the meaningful quantum signal the transmitting apparatus 110 has actually transmitted, when the receiving apparatus 120 determines that the meaningful quantum signal has been measured at a certain clock number.

When the probability of measurement is calculated, dark count and after-pulse of a single photon detector (SPD), visibility of an interferometer, losses in a channel and various elements, and the like should all be considered.

When the start-point is determined, the transmitting apparatus 110 and the receiving apparatus 120 drives the quantum key distribution protocol on the basis of the synchronized start-point. When the quantum key distribution system passes a success criteria such as quantum bit error rate (QBER), the start-point synchronization is considered to have been performed normally, and when the quantum key distribution system fails to pass, the start-point synchronization is started again. In the case that the quantum key distribution system fails to pass the success criteria a predetermined number of times (for example, three times) consecutively, the system is considered to have a hardware error, and is checked.

Hereinafter, description is given in detail about the method and apparatus for synchronizing the start-point according to at least one embodiment.

Figure 5:
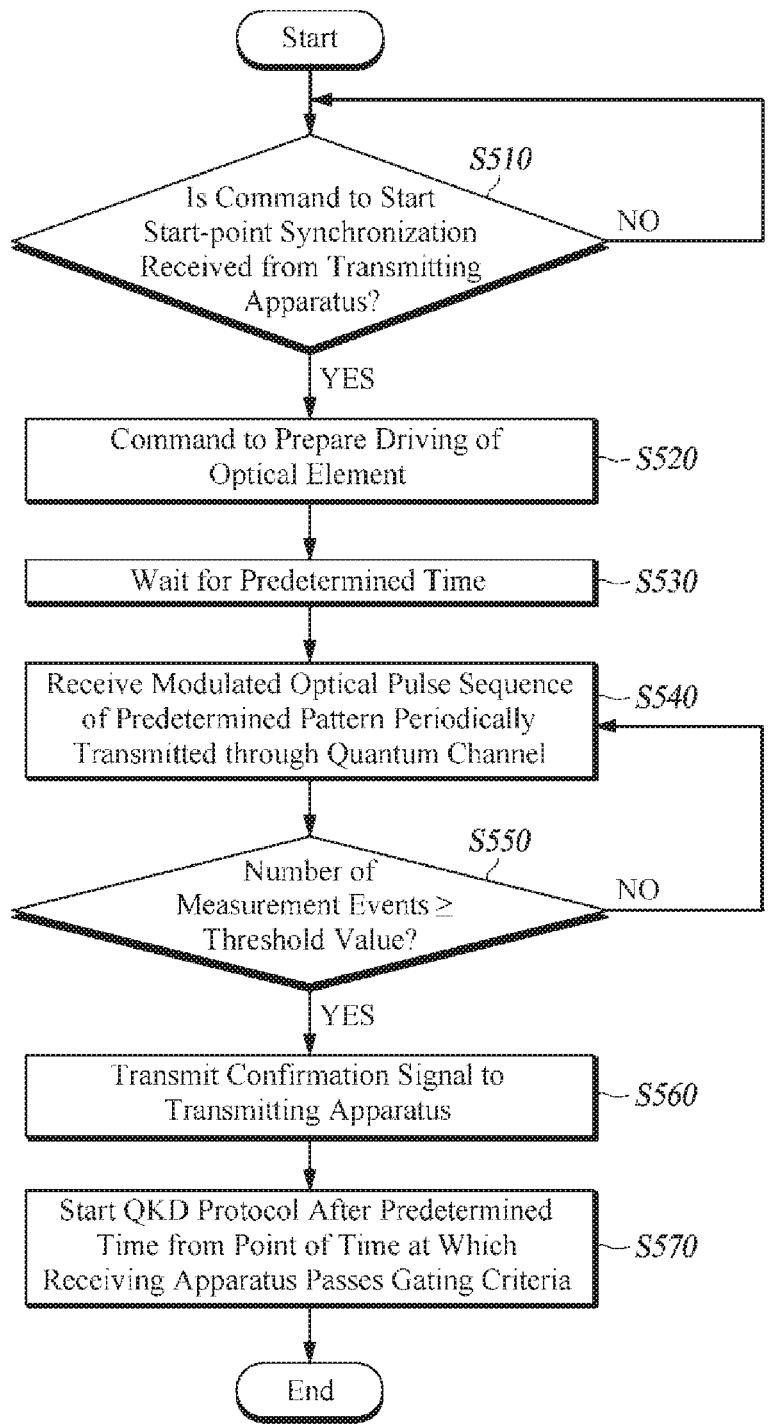
FIG. 5 is a flowchart showing a method, performed by a receiving apparatus of a quantum key distribution system, for synchronizing the start-point of quantum data, according to at least one embodiment.

FIG. 5 is a flowchart showing a method for synchronizing the start-point of quantum data performed by the receiving apparatus 120 of the quantum key distribution system, according to at least one embodiment.

When the receiving apparatus 120 receives a command to start the start-point synchronization from the transmitting apparatus 110 (S510), the receiving apparatus 120 commands the receiving-side optical unit to prepare driving of an optical element (S520). The receiving-side optical unit prepares driving of the optical element such that the optical element is optimized for the start-point synchronization.

After the receiving apparatus 120 waits for a time enough to ensure that both the transmitting apparatus 110 and the receiving apparatus 120 are in a mode of the start-point synchronization (S530), the receiving apparatus 120 receives an optical pulse sequence of a predetermined pattern periodically transmitted through the quantum channel.

The receiving apparatus 120 measures the meaningful quantum signal in the optical pulse sequence. The measurement of the quantum signal of the receiving apparatus 120 is performed on the basis of a predetermined basis sequence. In other words, unlike the fact that a basis sequence is determined randomly when the quantum key distribution protocol is performed, the predetermined basis sequence is used to measure the quantum signal when the start-point synchronization is performed.

When the number of times of measuring, at a certain point of time (hereinafter referred to as 'reference point of synchronization') of the optical pulse sequence, the meaningful quantum signal becomes the threshold value ('YES' of S550), the receiving apparatus 120 resets the clock counter, and transmits the confirmation signal to the transmitting apparatus 110 (S560). The threshold value may be adjusted by considering signal intensity, a signal transmission distance, and the like. The confirmation signal is a signal by which the receiving apparatus 120 notifies the transmitting apparatus 110 that the receiving apparatus 120 has normally measured the meaningful quantum signal.

The receiving apparatus 120 determines, as the start-point, a point of time at which one additional period of the optical pulse sequence has elapsed, right after the reference point of synchronization or a point of time at which the confirmation signal has been transmitted.

When the start-point is determined, the receiving apparatus 120 waits for a predetermined time needed to prepare driving of an optical element, and the like, and then starts the quantum key distribution protocol (S570).

Figure 6:
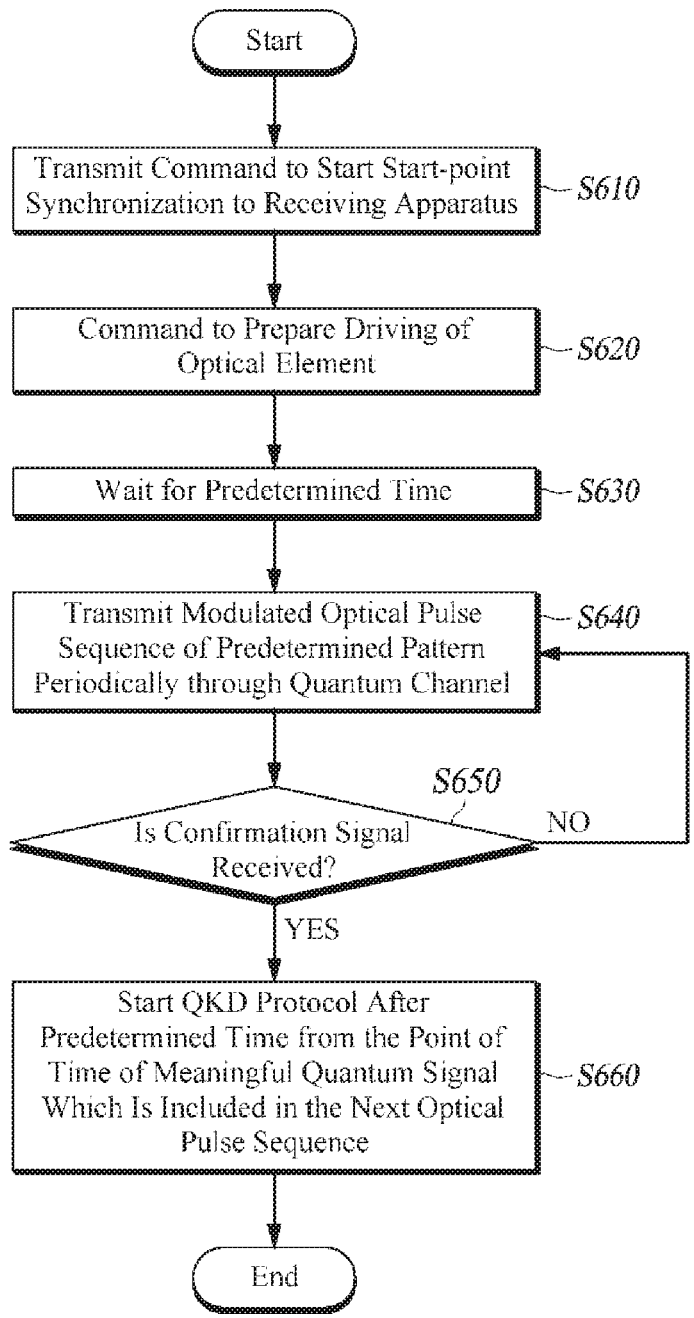
FIG. 6 is a flowchart showing a method, performed by a transmitting apparatus of the quantum key distribution system, for synchronizing the start point of quantum data, according to at least one embodiment.

FIG. 6 is a flowchart showing a method, performed by a transmitting apparatus 110 of the quantum key distribution system, for synchronizing the start-point of quantum data, according to at least one embodiment.

The transmitting apparatus 110 starts a mode of the start-point synchronization before the quantum key distribution protocol is started, or when malfunction occurs in the quantum key distribution system.

When the mode of the start-point synchronization is started, the transmitting apparatus 110 transmits a command to start the start-point synchronization to the receiving apparatus 120 (S610), and then commands the transmitting-side optical unit to prepare driving of an optical element (S620). At this time, the transmitting-side optical unit may change driving conditions of various elements for the start-point synchronization. For example, the intensity of an optical pulse transmitted when the start-point synchronization is performed may be made larger than the intensity of an optical pulse transmitted when the quantum key distribution protocol is performed, by setting a variable optical attenuator (VOA) to a low level.

After the transmitting apparatus 120 waits for a time enough to ensure that both the transmitting apparatus 110 and the receiving apparatus 120 are in a mode of the start-point synchronization (S630), the transmitting apparatus 120 periodically transmits a modulated optical pulse sequence of a predetermined pattern through the quantum channel (S640).

It can be arranged that the meaningful quantum signal is included only at a predetermined point of time within one period of the optical pulse sequence, and the meaningless quantum signal is included for the rest of time.

The transmission of the optical pulse sequence of the transmitting apparatus 110 is performed on the basis of a predetermined basis sequence and a predetermined bit sequence. In other words, unlike the fact that the basis sequence and the bit sequence are determined randomly when the quantum key distribution protocol is performed, the predetermined basis sequence and the predetermined bit sequence are used to encode and transmit the quantum signal when the start-point synchronization is performed.

When the transmitting apparatus 110 receives the confirmation signal from the receiving apparatus 120 ('YES' of S650), the transmitting apparatus 110 determines, as the start-point, the first point of time of the meaningful quantum signal just after the confirmation signal is received.

When the start-point is determined, the transmitting apparatus 110 waits for a time needed to prepare driving of the optical element, and the like, and then starts the quantum key distribution protocol (S660).

Hereinafter, description is given of a process in which each element of the quantum key distribution system in at least one embodiment synchronizes the start-point.

In the receiving apparatus 120 of the quantum key distribution system of at least one embodiment, the receiving-side optical unit 121 receives, through the quantum channel, a modulated optical pulse sequence of a predetermined pattern periodically transmitted from the transmitting apparatus 110.

When the number of times of measuring, at a certain point of time (that is, the reference point of synchronization) of the received optical pulse sequence, the meaningful quantum signal becomes the threshold value, the receiving-side signal processing unit 123 resets the clock counter, and transmits the confirmation signal to the transmitting-side signal processing unit 113.

The receiving-side signal processing unit 123 determines, as the s a point, a point of time at which one additional period of the optical pulse sequence has elapsed, right after the reference point of synchronization or a point of time at which the confirmation signal has been transmitted.

When the start-point is determined, the receiving-side signal processing unit 123 waits for a predetermined time needed to prepare driving of an optical element, and the like, and then starts the quantum key distribution protocol.

In the transmitting apparatus 110 of the quantum key distribution system of at least one embodiment, the transmitting-side optical unit 111 periodically transmits a modulated optical pulse sequence of a predetermined pattern through the quantum channel.

When the transmitting-side signal processing unit 113 receives the confirmation signal from the receiving-side signal processing unit 123, the transmitting-side signal processing unit 113 determines, as the start-point, the first point of time of the meaningful quantum signal just after the confirmation signal is received.

When the start-point is determined, the transmitting-side signal processing unit 123 waits for a predetermined time needed to prepare driving of an optical element, and then starts the quantum key distribution protocol.

Although exemplary embodiments of the present disclosure have been described for illustrative purposes, those skilled in the art will appreciate that various modifications, additions and substitutions are possible, without departing from the idea and scope of the claimed invention.

Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

The invention claimed is:

1. A method for determining a start-point of a quantum key distribution (QKD) protocol, the method performed by a receiving apparatus of a QKD system which starts the QKD protocol with a transmitting apparatus of the QKD system, the method comprising:
periodically measuring, at a predetermined period, an optical pulse sequence of a predetermined pattern, the optical pulse sequence in which a specific quantum signal is modulated only to a specific optical pulse, the optical pulse sequence periodically transmitted at the predetermined period through a quantum channel from the transmitting apparatus;
during periodically measuring the optical pulse sequence, monitoring clock timings within the predetermined period at which the specific quantum signal is detected;
transmitting a confirmation signal to the transmitting apparatus when the number of times of detecting the specific quantum signal at a certain clock timing within the predetermined period reaches a predetermined number of times; and
determining the start-point of the QKD protocol based on a point of time at which a predetermined additional time has elapsed, after a point of time when the number of times of detecting the specific quantum signal at the certain clock timing within the predetermined period has reached the predetermined number of times.

2. The method of claim 1, wherein the measuring is performed based on the same basis sequence as the basis sequence used by the transmitting apparatus to generate the optical pulse sequence.

3. The method of claim 1, wherein,
in the optical pulse sequence of the predetermined pattern,
the specific optical pulse modulated with the specific quantum signal has a stronger intensity than optical pulse used to perform the QKD protocol, and
the other optical pulses each either is a vacuum optical pulse or has a weaker intensity than the optical pulse used to perform the QKD protocol.

4. The method of claim 1, wherein the predetermined additional time is one period of the optical pulse sequence of the predetermined pattern.

5. A method of determining a start-point of a quantum key distribution (QKD) protocol, the method performed by a transmitting apparatus of a QKD system which starts the QKD protocol with a receiving apparatus of the QKD system, the method comprising:
transmitting periodically an optical pulse sequence of a predetermined pattern at a predetermined period through a quantum channel, the optical pulse sequence in which a specific quantum signal is modulated only to a specific optical pulse;
receiving a confirmation signal indicating that the number of times of detecting the specific quantum signal at a certain clock timing, within the predetermined period has reached a predetermined number of times, from the receiving apparatus; and
determining the start-point of the QKD protocol based on a time point at which the specific quantum signal will be first transmitted after receiving the confirmation signal.

6. The method of claim 5, wherein the transmitting is performed based on a predetermined basis sequence and a predetermined bit sequence, and wherein the predetermined basis sequence is used by the receiving apparatus for measuring the optical pulse sequence.

7. The method of claim 5, wherein, in the optical pulse sequence, the specific optical pulse modulated with the specific quantum signal has a stronger intensity than optical pulse used to perform the quantum key distribution protocol, and the other optical pulses each either is a vacuum optical pulse or has a weaker intensity than the optical pulse used to perform the quantum key distribution protocol.

8. The method of claim 5, wherein the predetermined period is determined depending on a distance between the transmitting apparatus and the receiving apparatus.

9. A receiving apparatus of a quantum key distribution (QKD) system, comprising:
a receiving-side optical unit configured to receive a quantum signal through a quantum channel; and
a receiving-side signal processing unit configured to
control the receiving-side optical unit to measure, at a predetermined period, the optical pulse sequence of a specific pattern, the optical pulse sequence in which a specific quantum signal is modulated only to a specific optical pulse, the optical pulse sequence periodically transmitted at the predetermined period through the quantum channel from a transmitting apparatus of the QKD system,
during periodically measuring the optical pulse sequence, monitor clock timings within the predetermined period at which the specific quantum signal is detected, transmit a confirmation signal to a transmitting apparatus when the number of times of detecting the specific quantum signal at a certain clock timing within the predetermined period reaches a predetermined number of times, and
determine the start-point of the QKD protocol based on a point of time at which a predetermined additional time has elapsed, after a point of time when the number of times of detecting the specific quantum signal at the certain clock timing within the predetermined period has reached the predetermined number of times.

* * * * *